United States Patent
Depondt

(10) Patent No.: US 10,189,448 B2
(45) Date of Patent: Jan. 29, 2019

(54) WIPER BLADE ADAPTER SYSTEM

(71) Applicant: Robert Bosch GmbH, Stuttgart (DE)

(72) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 986 days.

(21) Appl. No.: 14/408,013

(22) PCT Filed: Jun. 7, 2013

(86) PCT No.: PCT/EP2013/061801
§ 371 (c)(1),
(2) Date: Dec. 15, 2014

(87) PCT Pub. No.: WO2013/186140
PCT Pub. Date: Dec. 19, 2013

(65) Prior Publication Data
US 2015/0191155 A1    Jul. 9, 2015

(30) Foreign Application Priority Data

Jun. 13, 2012 (DE) .................. 10 2012 209 867
Jun. 14, 2012 (DE) .................. 10 2012 209 960

(51) Int. Cl.
*B60S 1/40* (2006.01)
*B60S 1/38* (2006.01)

(52) U.S. Cl.
CPC ............ *B60S 1/4003* (2013.01); *B60S 1/387* (2013.01); *B60S 1/407* (2013.01); *B60S 2001/4054* (2013.01); *Y10T 29/49815* (2015.01)

(58) Field of Classification Search
CPC ........................ B60S 1/387; B60S 1/4003
See application file for complete search history.

(56) References Cited

U.S. PATENT DOCUMENTS

| | | | |
|---|---|---|---|
| 6,625,842 B1* | 9/2003 | De Block | B60S 1/3849 15/250.32 |
| 8,528,155 B2* | 9/2013 | Chiang | B60S 1/4003 15/250.32 |
| 2009/0151110 A1 | 6/2009 | Ku | |
| 2009/0199357 A1* | 8/2009 | Thienard | B60S 1/3853 15/250.32 |

(Continued)

FOREIGN PATENT DOCUMENTS

| CN | 1964875 A | 5/2007 |
|---|---|---|
| DE | 102009029469 | 3/2011 |
| DE | 102010003372 | 9/2011 |

(Continued)

OTHER PUBLICATIONS

KR20100023942A (machine translation), 2010.*

(Continued)

*Primary Examiner* — Andrew A Horton
(74) *Attorney, Agent, or Firm* — Michael Best & Friedrich LLP

(57) ABSTRACT

The invention relates to a wiper blade adapter system comprising a wiper blade adapter unit (10) having a coupling unit (18) and at least two connection units (12, 14, 16) that have different forms. According to the invention, the coupling unit (18) comprises a lateral plug-in unit that is provided for coupling to one of the at least two connection elements (12, 14, 16) in an assembly step.

17 Claims, 5 Drawing Sheets

(56) References Cited

U.S. PATENT DOCUMENTS

2010/0186185 A1\* 7/2010 Grasso .................... B60S 1/387
                                                                                     15/250.32
2011/0277265 A1\* 11/2011 Ehde ..................... B60S 1/4003
                                                                                     15/250.32

FOREIGN PATENT DOCUMENTS

| DE | 102010003372 A1 | | 9/2011 | |
|----|----|----|----|----|
| DE | 102010030880 | | 1/2012 | |
| EP | 1847425 | | 10/2007 | |
| FR | 2924080 | | 5/2009 | |
| KR | 20100023942 A | \* | 3/2010 | ............ B60S 1/4048 |
| WO | 2008145481 A1 | | 12/2008 | |
| WO | 2013098081 | | 7/2013 | |

OTHER PUBLICATIONS

International Search Report for Application No. PCT/EP2013/061801 dated Sep. 18, 2013 (English Translation, 3 pages).

\* cited by examiner

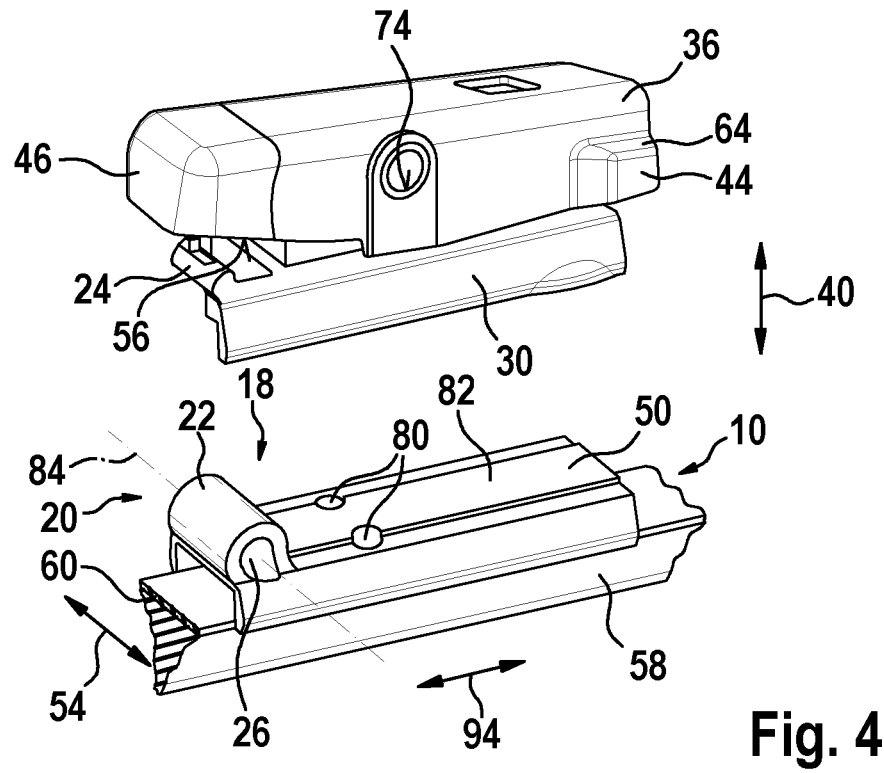
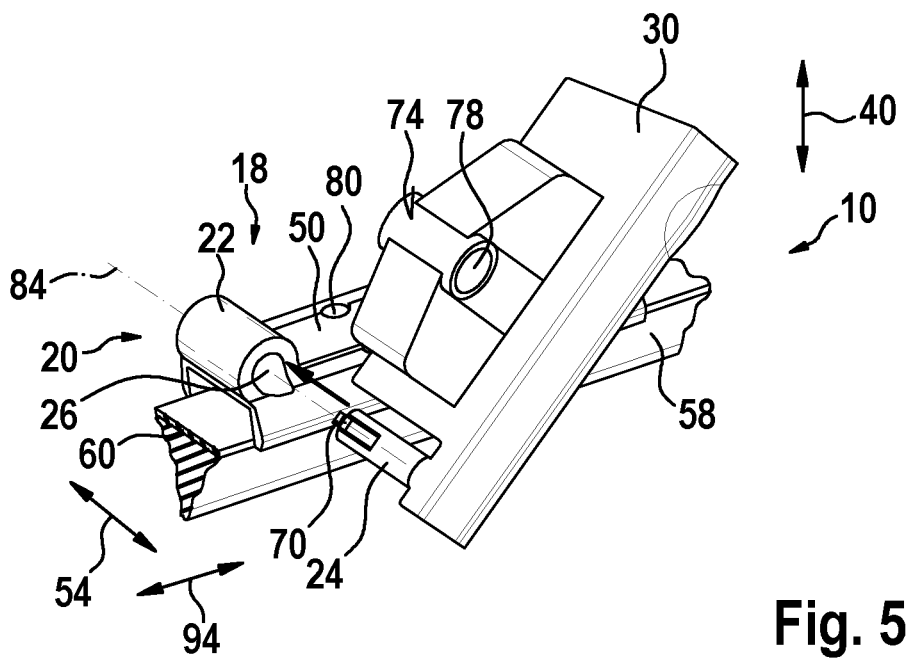
Fig. 4
Fig. 5

WIPER BLADE ADAPTER SYSTEM

BACKGROUND OF THE INVENTION

The invention relates to a wiper blade adapter system.

A wiper blade adapter system comprising a wiper blade adapter unit having a coupling unit and at least two connection units that have different forms is already known.

SUMMARY OF THE INVENTION

The invention relates to a wiper blade adapter system comprising a wiper blade adapter unit having a coupling unit and at least two connection units that have different forms.

According to the invention, the coupling unit comprises a lateral plug-in unit that is provided for coupling to one of the at least two connection elements in an assembly step, whereby a particularly simple final assembly of the wiper blade adapter system can be achieved. A "wiper blade adapter unit" is particularly to be understood in this context as a unit which has a contact region for a connection element and can be captively connected to the connection element and is furthermore intended to provide a coupling region of a wiper blade component of a wiper blade, such as, in particular, a spring rail, a wiper strip, a wind deflector element and/or a wiper lip, for coupling and/or contacting to the connection element. The relative clause "that have different forms" refers particularly in this context to the fact that a form of a component deviates from a form of a further component. A "connection unit" is particularly to be understood in this context as a unit which is provided to connect the wiper blade adapter unit to a wiper arm and/or to a wiper arm adapter. The connection unit is particularly intended to provide a coupling region for coupling a wiper arm and/or a wiper arm adapter. The connection unit is particularly provided to be coupled to different types of wiper arm adapters. "Different types of wiper arm adapters" refers in this context particularly to different wiper arm adapter systems which are different in the design thereof and/or in the fastening function thereof. This relates preferably to wiper arm adapter systems that are standardized differently. A first type of a wiper arm adapter is to be particularly understood in this context as a wiper arm adapter which has a mounting pin and a support plate. A further possible type of a wiper arm adapter refers in this context particularly to a wiper arm adapter which has an elongated, hook-shaped base body having a bend of 180 degrees. A further possible type of a wiper arm adapter is particularly to be understood in this context as a wiper arm adapter which has two rear abutments and a fixing lug. A further possible type of a wiper arm adapter is particularly to be understood in this context as a wiper arm adapter which has a mounting recess and a base body having an s-shaped profile. A further possible type of a wiper arm adapter refers in this context particularly to a wiper arm adapter which has a mounting recess and walls comprising mounting means. A "coupling unit" refers in this context particularly to a unit which is provided to couple a wiper blade to a wiper arm. The term "to couple" refers in this context particularly to connecting in a force-fitting and/or form-fitting manner. An "assembly step" is to be particularly understood in this context as a step that is carried out by an end user or, respectively, final consumer, wherein at least one final assembly step is performed during the process by which the wiper blade adapter system can be brought into an operating state. An "end user" refers in this context particularly to a final consumer and/or a private person who has a command of basic technical skills. The end user differs from a production employee and/or repair shop employee and/or a person possessing extensive technical skills and/or a person skilled in the art working in the relevant technical field. It is furthermore advantageous for an assembly by the end user to take place without tools. A "lateral plug-in unit" is to be understood in this context particularly as a unit which is provided to guide at least two components together into a coupled state using a translational movement, wherein the movement takes place at least substantially parallel to a wiping direction. "At least substantially" is particularly to be understood in this context as a deviation of less than 30 degrees, preferably of less than 20 degrees, and in a particularly preferable manner of less than 10 degrees. A "wiping direction" is particularly to be understood in this context as a direction in which the wiper blade adapter system is moved relative to a vehicle window pane in an operating state. In an arcuate or otherwise curved direction of movement of the wiper blade adapter system, the wiping direction corresponds to a tangential direction to the direction of movement. The wiping direction is oriented, in particular, at least substantially perpendicular to a main longitudinal extension of the wiper blade adapter unit and is oriented at least substantially perpendicular to a vertical direction. The vertical direction extends at least substantially perpendicularly to a vehicle surface to be wiped. The term "is provided" is particularly to be understood as being specially designed and/or equipped.

According to a further embodiment of the invention, the lateral plug-in unit comprises a receiving element which is provided for receiving a plug element of one of the at least two connection units, whereby a particularly simple design of the lateral plug-in unit can be achieved. A "receiving element" refers in this context particularly to an element which is provided for receiving or, respectively, coupling a further component at least in a form-fitting manner. A "plug element" is particularly to be understood in this context as an element which is provided to be plugged into a further element. The plug element is preferably provided to be plugged into the receiving element. In a particularly preferable manner, the plug element rests in the receiving element in a form-fitting manner. In a particularly preferable manner, the plug element is designed substantially in the shape of a cylinder.

According to the invention, the receiving element further comprises a mounting channel which extends substantially parallel to a wiping direction, whereby the connection unit can be mounted especially quickly and simply in the wiping direction. A "mounting channel" is particularly to be understood in this context as a longitudinal recess which is provided for supporting a component to be mounted.

According to the invention, the mounting channel furthermore has a substantially circular cross section and is provided for pivotably mounting one of the at least two connection units, whereby a pivotable mounting of the connection unit can be achieved in a particularly simple manner without requiring the use of additional components.

If the lateral plug-in unit is provided to be detachably coupled to the at least two connection units, the connection units can be advantageously replaced as desired. "Detachably" refers in this context particularly to being removable in a non-destructive manner.

In an advantageous manner, the wiper blade adapter system can be flexibly employed if said system comprises at least three connection elements that have different forms, said connection elements being provided for coupling to different types of wiper arm adapters.

According to a further embodiment of the invention, the at least two connection elements that have different forms are provided for coupling to different types of wiper arm adapters, whereby the wiper blade adapter system can advantageously be used in a particularly flexible manner.

The invention further proposes that at least one connection unit of the at least two connection units comprises an intermediate element that is provided for coupling to the wiper blade adapter unit and a connection element of the connection unit, whereby connection elements having different forms can advantageously be mounted to the wiper blade adapter unit. An "intermediate element" is particularly to be understood in this context as an element which is intended to provide a coupling region for a wiper blade, a wiper blade component and/or a wiper blade adapter unit. The intermediate element is preferably designed to be separate from the connection element. A "connection element" refers in this context particularly to an element which is intended to provide a contact region and/or coupling region of the connection unit for coupling to a wiper arm and/or a wiper arm adapter.

According to the invention, the intermediate element furthermore comprises a plug element which is provided to be inserted into the lateral plug-in unit during an assembly step, whereby a particularly easy mounting of the intermediate element to the lateral plug-in unit can be achieved. The plug element preferably has the identical cross section as a mounting channel of the lateral plug-in unit. In a particularly preferable manner, the plug element is of cylindrical design.

According to a further embodiment of the invention, the intermediate element comprises a detent element which is provided to prevent the plug element from detaching from the lateral plug-in unit, whereby the intermediate element can be mounted especially quickly and reliably to the lateral plug-in unit. A "detent element" is particularly to be understood in this context as a resilient element for producing a detent connection, said resilient element being provided to be resiliently deflected during assembly.

The invention further proposes that at least one of the at least two connection units has a second detent element which is provided to prevent the connection unit from pivoting relative to the wiper blade adapter unit in an assembled state, whereby the connection unit can advantageously be prevented from detaching from the wiper blade adapter unit. The second detent element is preferably disposed on the intermediate element.

According to the invention, at least one connection unit of the at least two connection units further comprises an intermediate element, a connection element and a covering part which are formed separately from one another and are coupled to one another in an assembled state, whereby, in particular, a variety of embodiment options of the connection unit can be achieved.

If the intermediate element has a curved bearing surface which is provided to pivotably mount the connection element in an assembled state, a particularly flexible mounting of a wiper blade can be achieved. In a particularly advantageous manner, the bearing surface is convexly curved, whereby a compact mounting with a simple design can be achieved.

In a further embodiment of the invention, at least one connection unit of the at least two connection units comprises a connection element which has at least one side wall that can be elastically deflected and is provided for coupling to the intermediate element, whereby a particularly fast and reliable coupling of the connection element to the intermediate element can be achieved.

If at least the first side wall comprises a mounting recess in which the intermediate element at least partially engages in an assembled state, the connection element can be mounted to the intermediate element in a particularly compact manner. The mounting recess is preferably formed from a borehole. In a particularly preferable manner, the mounting recess extends in the vertical direction. In principle, it is also conceivable to dispose further mounting recesses in which the intermediate element at least partially engages in an assembled state.

If at least one connection unit of the at least two connection units comprises a connection element that has an oblique stop surface which is provided to delimit a deflection of a connection unit of the at least two connection units relative to a base body of the wiper blade adapter unit, the connection element can be advantageously prevented from excessively pivoting relative to the base body. The oblique stop surface preferably faces the wiper blade. In a particularly preferred manner, the oblique stop surface abuts against the wiper blade adapter unit in order to delimit a deflection of the connection unit.

A method is furthermore proposed according to the invention, wherein a connection unit is detached from a wiper blade adapter unit by the connection unit being lifted on one side, whereby a particularly simple disassembly can be performed.

BRIEF DESCRIPTION OF THE DRAWINGS

Further advantages ensue from the following description of the drawings. In the drawings, an exemplary embodiment of the invention is depicted. The drawings, the description and the claims contain numerous features in combination. The person skilled in the art will also expediently consider the features in isolation and put them together to form further useful combinations.

In the drawings:

FIG. 4 shows the wiper blade adapter system from FIG. 3 in an assembled state in a perspective view;

FIG. 5 shows the wiper blade adapter system from FIG. 4 in an assembly step;

DETAILED DESCRIPTION

Figure 1:
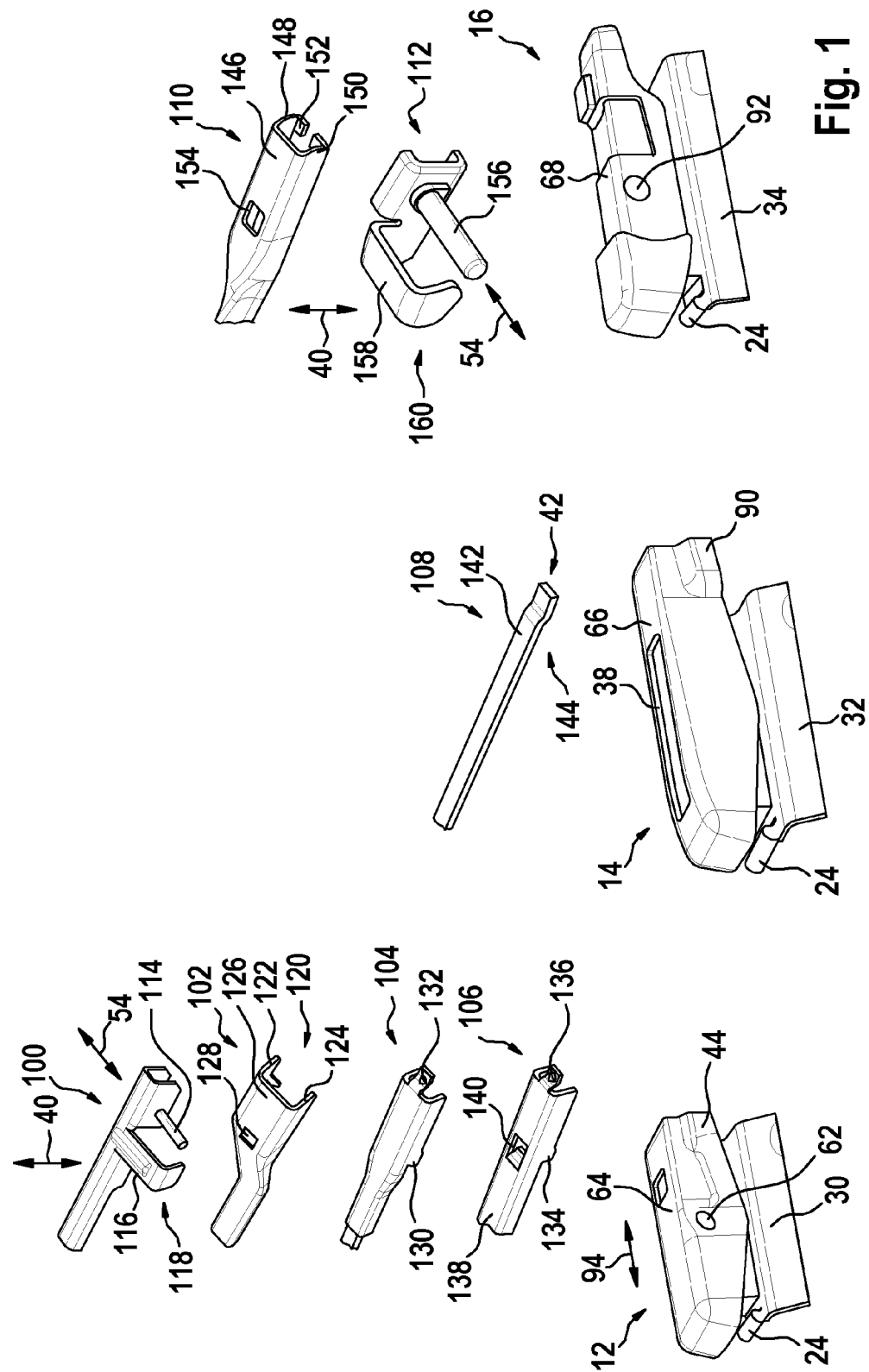
FIG. 1 shows three connection elements of a wiper blade adapter system according to the invention and a wiper arm adapter from different wiper arm adapter systems in a perspective view.

FIG. 1 shows three connection units 12, 14, 16 of an inventive wiper blade system that have different forms. The wiper blade adapter system is provided for coupling different wiper arm adapter systems to a wiper blade 58 and to a wiper strip 60. To this end, the three connection units 12, 14, 16 that have different forms are provided for coupling to different types of wiper arm adapters, 100, 102, 104, 106, 108, 110, 112. The wiper arm adapters 100, 102, 104, 106, 108, 110, 112 of the different wiper arm adapter systems are already known from the prior art and at least partially standardized.

The first connection unit 12 is provided for coupling to four wiper arm adapters 100, 102, 104, 106 that have different forms. The first wiper arm adapter 100 comprises a mounting pin 114 and a support plate 116. The mounting pin 114 extends parallel to a wiping direction 54 of the wiper blade adapter system. The support plate 116 extends initially parallel to the mounting pin 114 and bends in an end region at an angle of 90 degrees in a vertical direction 40 of the wiper blade adapter system. The second wiper arm adapter 102 has a U-shaped receiving area 120 which is spanned by two side walls 122, 124 that extend parallel to one another and a supporting wall 126. The supporting wall 126 is disposed perpendicularly to the side walls 122, 124. A positioning recess 128 is disposed in the supporting wall 126, said recess being provided for a defined positioning of the second wiper arm adapter 102 on the connection unit 12. The third wiper arm adapter 104 has two rear abutments 130 that are formed by the side walls and a mounting lug 132. The mounting lug 132 is formed as an extension at a free end of the third wiper arm adapter 104. The fourth wiper arm adapter 106 has two rear abutments 134 which are formed from side walls and a mounting lug 136. The mounting lug 136 is formed as an extension at a free end of the fourth wiper arm adapter 106. The fourth wiper arm adapter 106 further comprises a supporting wall 138 in which a positioning recess 140 is disposed that is provided for a defined positioning of the fourth wiper arm adapter 106 on the first connection unit 12. The first wiper arm adapter 100, the second wiper arm adapter 102, the third wiper arm adapter 104 and the fourth wiper arm adapter 106 can be detachably coupled in a known manner to the first connection unit 12.

The second connection unit 14 is provided for coupling to a fifth wiper arm adapter 108 which has a further type of design. The fifth wiper arm adapter 108 has a mounting arm 142 which has an S-shaped bend. The fifth wiper arm adapter 108 can be detachably coupled in a known manner to the second connection unit 14.

The third connection unit 16 is provided for coupling to a sixth wiper arm adapter 110 and a seventh wiper arm adapter 112, which in each case are formed in a further type of design. The sixth wiper arm adapter 110 has a base wall 146 on which two side walls 148, 150 are disposed. The side walls 148, 150 enclose in each case an angle of 90 degrees with the base wall 146. Fastening means 152 are arranged at a lower end of the respective side wall 148, 150, which in turn form an angle of 90 degrees to the side walls 148, 150. A mounting recess 154 is additionally disposed in the base wall 146 of the wiper arm adapter 110. The seventh wiper arm adapter 112 comprises a mounting pin 156 and a support plate 158. The mounting pin 156 extends parallel to a wiping direction 54 of the wiper adapter system. The support plate 158 extends initially parallel to the mounting pin 156 and bends at an angle of 90 degrees in the vertical direction 40 in an end region 160. The sixth wiper arm adapter 110 and the seventh wiper arm adapter 112 can be detachably coupled in a known manner to the third connection unit 16.

The first connection unit 12 has a transverse recess 62 which is provided to receive the mounting pin 114 of the wiper arm adapter 100. The first connection unit 12 has a lateral molding 44. The lateral molding 44 protrudes from a wall of the first connection unit 12 and forms a gripping region for a user. The transverse recess 62 has a circular cross section.

The second connection unit 14 has a longitudinal recess 38 which opens the connection unit 14 towards the vertical direction 40 and is provided for receiving a wiper arm end region 42. The second connection unit 14 has a lateral molding 90. The lateral molding 90 protrudes from a wall of the second connection unit 14 and forms a gripping region for a user.

The third connection unit 16 has a transverse recess 92 which is provided for receiving the mounting pin 156 of the wiper arm adapter 112. The wiper arm adapters 100, 102, 104, 106, 108, 110, 112 are not further depicted in the subsequent drawings for the sake of clarity.

Figure 2:
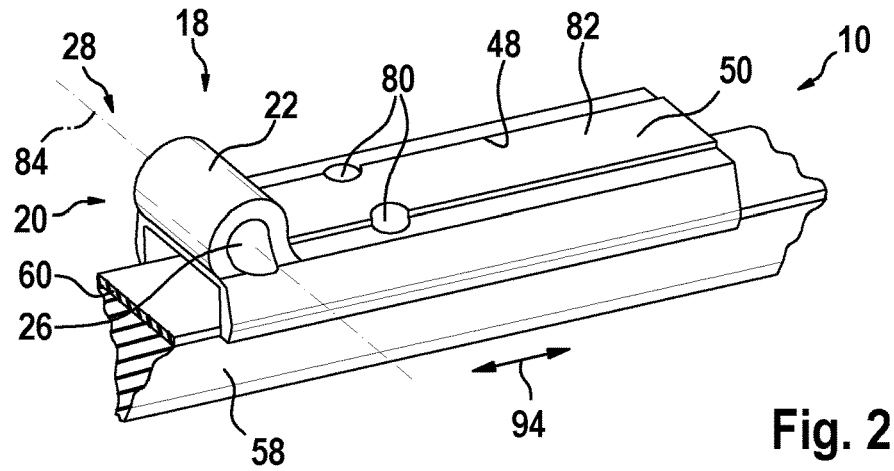
FIG. 2 shows a wiper blade adapter unit of the wiper blade adapter system from FIG. 1 in a perspective view.

The wiper blade adapter system further comprises a wiper blade adapter unit 10 as shown in FIG. 2. The wiper blade adapter 10 comprises a coupling unit 18 which is provided for coupling to one of the three connection units 12, 14, 16 in an assembly step by an end user. To this end, the wiper blade adapter unit 10 comprises a contact region for one of the three connection units 12, 14, 16.

The wiper blade adapter unit 10 is captively connected to one of the three connection units 12, 14, 16 in an assembled state. The wiper blade adapter unit 10 has two mounting recesses 80 which are provided for coupling to the wiper blade 58 and are disposed in a base plate 82. The mounting recesses 80 are formed from boreholes which extend in the vertical direction.

The coupling unit 18 is provided to be detachably coupled to one of the three connection units 12, 14, 16. In other words, a connection unit 12, 14, 16 coupled to the coupling unit 18 can be separated from said coupling unit 18 in a non-destructive manner. To this end, the coupling unit 18 comprises a lateral plug-in unit 20 which is provided for coupling to one of the three connection units 12, 14, 16 in an assembly step.

The lateral plug-in unit 20 is provided for coupling to one of the three connection units 12, 14, 16 in a detachable manner. The lateral plug-in unit 20 is further provided to guide the wiper blade adapter unit 10 and the connection unit 12, 14, 16 together into a coupled state using a translational movement, wherein the movement takes place parallel to the wiping direction 54. To this end, the lateral plug-in unit 20 comprises a receiving element 22 which is provided for receiving a plug element 24 of an intermediate element 30 from one of the three connection units 12, 14, 16.

The receiving element 22 is provided for receiving the plug element 24 at least in a form-fitting manner or, respectively, for coupling said plug element. The receiving element 22 is disposed in an end region 28 of the wiper blade adapter unit 10 which extends ten millimeters long, as viewed in a longitudinal direction 94 from a free end of the wiper blade adapter unit 10. The longitudinal direction 94 extends substantially parallel to a longitudinal extension of the wiper blade adapter unit 10. The longitudinal extension is thereby an extension of the wiper blade adapter unit 10 that is as large as possible.

The plug element 24 is designed cylindrically. Thus, said plug element 24 has a circular cross section. Said plug element 24 is provided to be inserted into the lateral plug-in unit 20 during an assembly step. Said plug element 24 is therefore provided to be inserted into the receiving element 22. In an assembled state, the plug element 24 rests in the receiving element 22 in a form-fitting manner.

The receiving element 22 comprises a mounting channel 26 that extends parallel to the wiping direction 54. The mounting channel 26 is provided for mounting the plug element 24. The mounting channel 26 has a substantially circular cross section and is provided for pivotably mounting one of the three connection units 12, 14, 16. A diameter of the mounting channel 26 corresponds to a diameter of the plug element 24. The mounting channel 26 is open towards the wiping direction 54. In addition, the mounting channel 26 extends partially in a supporting wall 48 of a base body 50 of the wiper blade adapter unit 10. The supporting wall 48 extends substantially parallel to a surface to be wiped.

The intermediate element 30 of the connection units 12, 14, 16 is provided for coupling to the wiper blade adapter unit 10. Each connection unit 12, 14, 16 has additionally a connection element 64, 66, 68. The intermediate element 30 is provided for coupling to one of the connection elements 64, 66, 68. The intermediate element 30 is formed separately from the connection element 64, 66, 68.

In FIGS. 3 to 7, an assembly step of the first connection unit 12 to the wiper blade adapter unit 10 is depicted by way of example. The principal assembly step to the wiper blade adapter unit 10 is, however, not limited to the first connection unit 12 but can analogously be applied to the second and third connection unit 14, 16.

Figure 3:
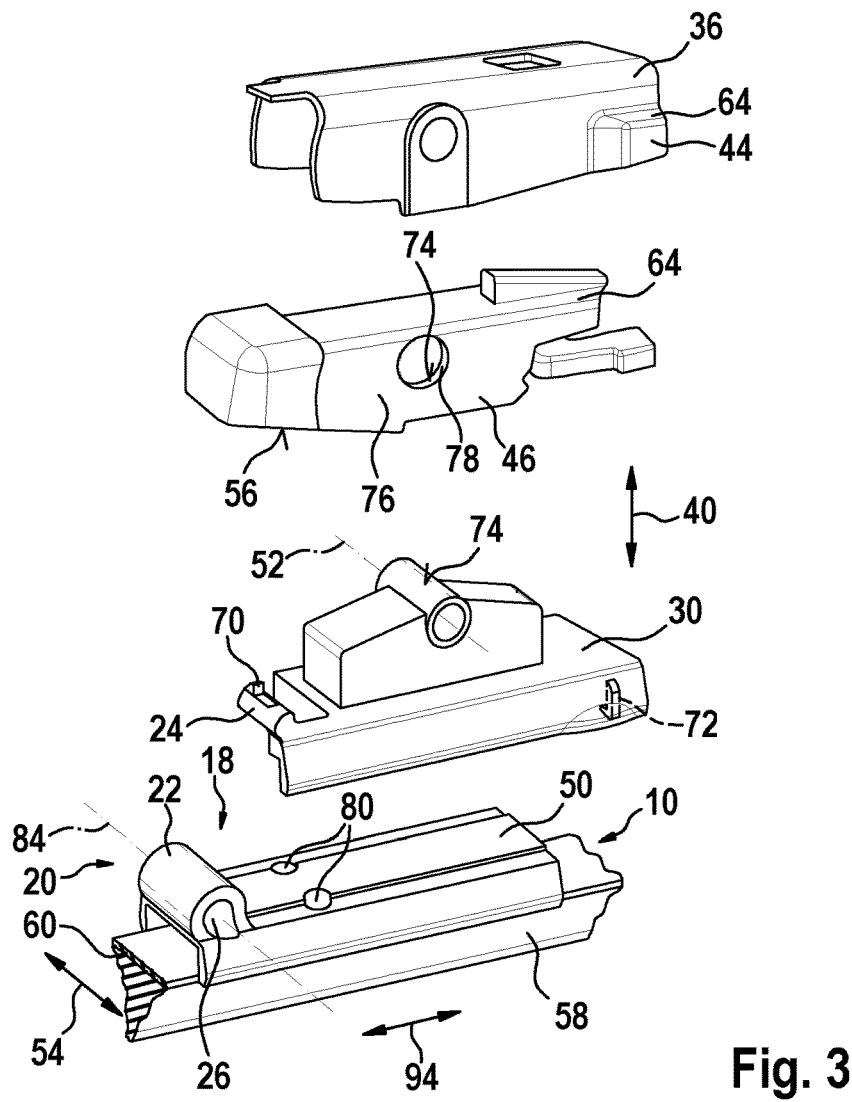
FIG. 3 shows the wiper blade adapter system from FIGS. 1 and 2 in a perspective view.

FIG. 3 shows the wiper blade adapter system prior to an assembly process. The connection element 64 is designed as two parts. A covering part 36 of the connection element 64 is coupled to a base part 46 during an assembly step. The covering part 36 is thereby intended to provide a contact region for coupling at least one wiper arm adapter system. It is however conceivable in this context for the connection element 64 to be designed as one piece. The lateral molding 44 is disposed on the covering part 36 and forms a gripping region for a user.

The intermediate element 30 has a first detent element 70 that is provided to prevent the plug element 24 from detaching from the lateral plug-in unit 20 in an assembled state. To this end, the detent element 70 is disposed at a free end of the plug element 24. The plug element 24 has for this reason a groove-shaped recess, across which the first detent element 70 extends.

The first detent element 70 has a boss at a free end thereof, which in an assembled state engages in a recess of the receiving element 22, which is not depicted in detail. It is however conceivable in this context for the first detent element 70 to be disposed at another position, so that a movement of the intermediate element 30 relative to the wiper blade adapter unit 10 is prevented.

The connection unit 12 further comprises a second detent element 72 which is provided to prevent the connection unit 12 from pivoting relative to the wiper blade adapter unit 10 in the assembled state. The second detent element 72 is disposed on the intermediate element 30 for this purpose. Said second detent element 72 is thereby disposed, as viewed in the longitudinal direction 94, at an end region of the intermediate element 30 which lies opposite to the first detent element 70.

The intermediate element 30, the connection element 64 and the covering part 36 are designed separately from one another and are coupled to one another in an assembled state. The intermediate element 30 has a curved bearing surface 74 which is provided for pivotably mounting the connection element 64 about a pivoting axis 52 in an assembled state. The bearing surface 74 is thereby convexly curved.

The connection element 64 has a first elastically deflectable side wall 76 which is provided for coupling to the intermediate element 30. In addition, the connection element 64 has a second elastically deflectable side wall which is disposed in a rear portion and is not depicted in detail and which is provided for coupling to the intermediate element 30. The second side wall is thereby identical in construction to the first side wall 76.

The first side wall 76 comprises a mounting recess 78 in which the intermediate element 30 engages in an assembled state. The bearing surface 74 of the intermediate element thereby abuts against a surface of the side wall 76 that delimits the mounting recess 78. When the connection element 64 is placed on the intermediate element 30, the first and second side wall 76 are initially deflected by the intermediate element 30 and then lock on the bearing surface 74 (FIG. 4).

The connection element 64 has an oblique stop surface 56 which is provided for delimiting a deflection of the connection unit 12 relative to the base body 50 of the wiper blade adapter unit 10. The oblique stop surface 56 thereby faces the wiper blade 58. The oblique stop surface 56 abuts against the base body 50 in order to delimit a deflection of the connection unit 12.

Figure 6:
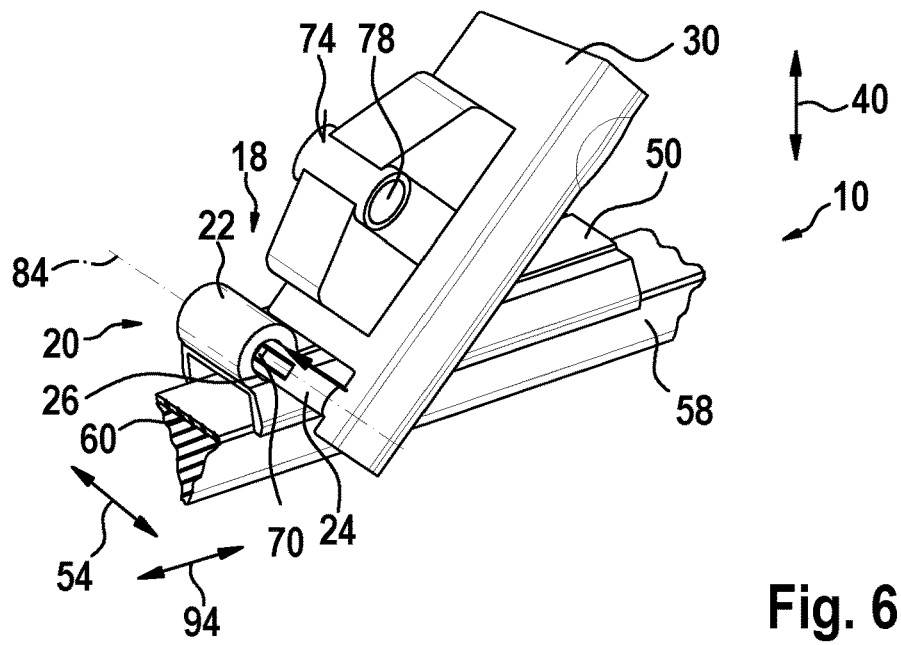
FIG. 6 shows the wiper blade adapter system from FIG. 4 in a further assembly step.

A further assembly step of the wiper blade adapter system is shown in FIGS. 5 and 6. The connection element 64 is not depicted for the sake of clarity. The plug element 24 is thereby inserted into the receiving element 22. The detent element 70 is thereby deflected and subsequently engages in a detent recess in the receiving element 22 that is not depicted in detail.

Figure 7:
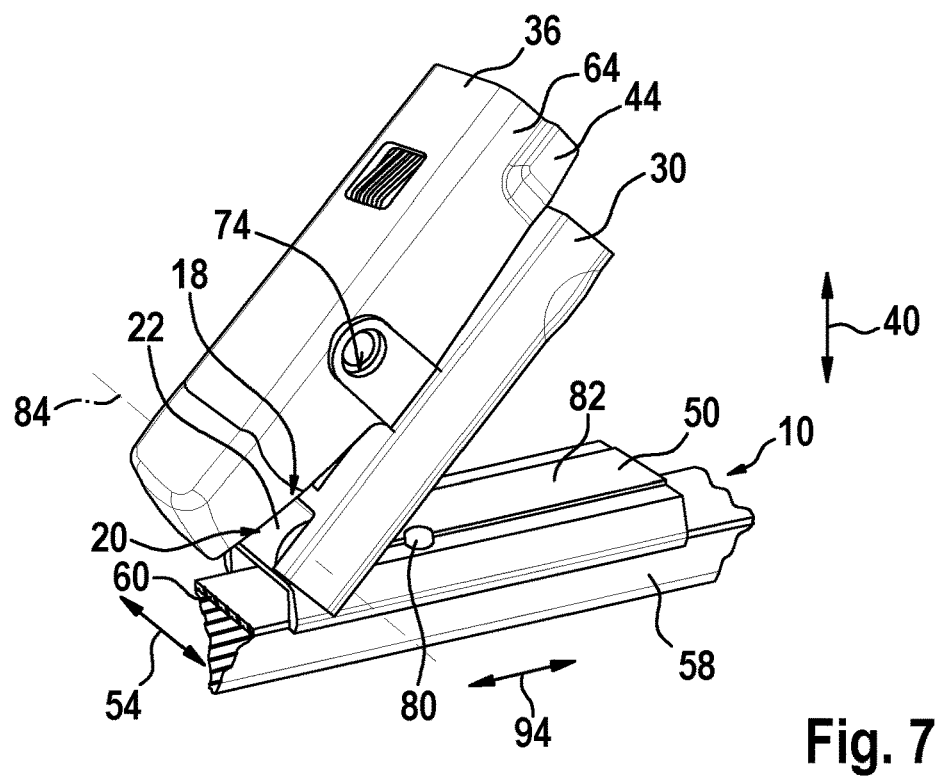
FIG. 7 shows the wiper blade adapter system from FIG. 4 in a further assembly step and FIG. 8 shows the wiper blade adapter system from FIG. 4 in an assembled state.

A last assembly step of the wiper blade adapter system is shown in FIG. 7. The connection unit 12 is pivoted about a pivoting axis 84 which extends coaxially to the mounting channel 26. The connection unit 12 ultimately rests on the base plate 82 of the wiper blade adapter unit 10. In said last assembly step, the second detent element 72 is deflected by the base body 50 and finally engages in a detent recess, which is not depicted in detail, in the base body 50. The connection unit 12 is thus prevented from pivoting back.

Figure 8:
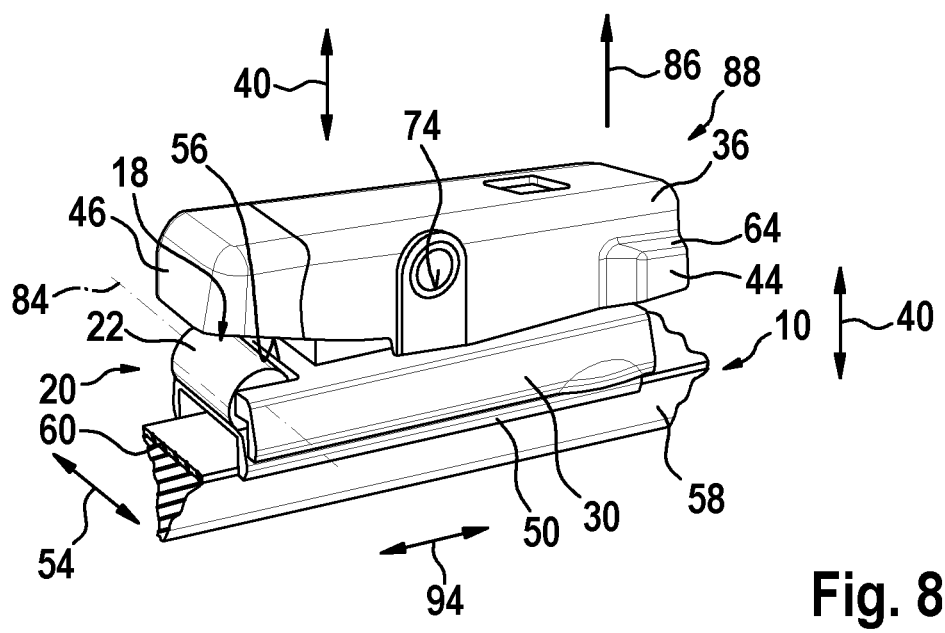

The wiper blade adapter system is shown in an assembled state in FIG. 8. During disassembly, the connection unit 12 is detached from the wiper blade adapter unit 10 by the connection element 12 being lifted on one side. To this end, a lifting force 86 is exerted, in particular by the end user, on the connection unit 12 in a lifting region 88. The lifting force 86 takes place parallel to the vertical direction 40. The lifting force 86 is furthermore oriented away from the wiper blade 58.

The lifting region 88 is disposed at a free end of the connection unit 12, as viewed in the longitudinal direction 94. The lateral molding 44 is likewise disposed in the lifting region 88 and forms a grip for lifting the connection unit 12. The second detent element 72 is initially released from the locking position thereof by the lifting force 86. The connection unit 12 can be subsequently pivoted about pivoting axis 84. By pulling on the connection unit 12 in the wiping direction, the first detent element 70 is released from the locking position thereof. After disassembly has been completed, the first connection unit 12 can be replaced with the second or third connection unit 14, 16. The second and third connection unit 14, 16 can be mounted to the wiper blade adapter unit 10 in the same manner as the first connection unit 12.

What is claimed is:

1. A wiper blade adapter system comprising a wiper blade adapter unit (10) having a coupling unit (18) and at least two separate connection units (12, 14, 16) that have different overall forms and are each configured to couple to a different type of wiper arm adapter and to the coupling unit (18), wherein the at least two connection units each include a projecting plug element (24), wherein the coupling unit (18)

includes a lateral plug-in unit (20) configured for coupling to the at least two connection units (12, 14, 16) in an assembly step, wherein the lateral plug-in unit (20) includes a receiving element (22) configured for receiving the plug element (24) of each one of the at least two connection units (12, 14, 16), wherein the receiving element (22) includes a mounting channel (26) defined by a closed cross-sectional circumference, wherein the receiving channel extends at least substantially parallel to a wiping direction (54) and is open at one end along the wiping direction such that during the assembly step the projecting plug element (24) of one of the connection units (12, 14, 16) is pushed along the wiping direction (54) and into the mounting channel (26), wherein at least one connection unit (12, 14, 16) of the at least two connection units (12, 14, 16) includes an intermediate element (30, 32, 34) which is configured for coupling to a connection element (64, 66, 68) of the at least one connection unit (12, 14, 16).

2. The wiper blade adapter system according to claim 1, characterized in that the mounting channel (26) has a substantially circular cross section and is configured for pivotably mounting one of the at least two connection units (12, 14, 16).

3. The wiper blade adapter system according to claim 1, characterized in that the lateral plug-in unit (20) is configured for coupling to one of the at least two connection units (12, 14, 16) in a detachable manner.

4. The wiper blade adapter system according to claim 1, characterized by at least three connection units (12, 14, 16) that have different forms and are configured for coupling to different types of wiper arm adapters (100, 102, 104, 106, 108, 110, 112).

5. The wiper blade adapter system according to claim 1, characterized in that each connection unit includes an intermediate element (30, 32, 34) having a first detent element (70) which is configured to prevent the plug element (24) from detaching from the lateral plug-in unit (20).

6. The wiper blade adapter system according to claim 5, characterized in that at least one of the at least two connection units (12, 14, 16) comprises a second detent element (72) which is configured to prevent the at least one of the at least two connection units (12, 14, 16) from pivoting relative to the coupling unit (18) in an assembled state.

7. The wiper blade adapter system of claim 5, wherein the first detent element is disposed on the projecting plug element.

8. The wiper blade adapter system according to claim 1, characterized in that at least one connection unit (12, 14, 16) of the at least two connection units (12, 14, 16) comprises an intermediate element (30, 32, 34), a connection element (64, 66, 68) and a covering part (36) which are formed separately from one another and are coupled to one another in an assembled state.

9. The wiper blade adapter system according to claim 1, characterized in that the intermediate element (30, 32, 34) has a curved bearing surface (74) which is configured for pivotably mounting the connection element (64, 66, 68) in an assembled state.

10. The wiper blade adapter system according to claim 9, characterized in that the bearing surface (74) is convexly curved.

11. The wiper blade adapter system according to claim 1, characterized in that at least one connection unit (12, 14, 16) of the at least two connection units (12, 14, 16) comprises a connection element (64, 66, 68) which has at least one first elastically deflectable side wall (76) that is configured for coupling to the intermediate element (30, 32, 34).

12. The wiper blade adapter system according to claim 11, characterized in that at least the first elastically deflectable side wall (76) comprises a mounting recess (78, 80) in which the intermediate element (30, 32, 34) at least partially engages in an assembled state.

13. The wiper blade adapter system according to claim 1, characterized in that at least one connection unit (12, 14, 16) of the at least two connection units (12, 14, 16) comprises a connection element (64, 66, 68) that has an oblique stop surface (56) which is elastically deflectable for delimiting a deflection of a connection unit (12, 14, 16) of the at least two connection units (12, 14, 16) relative to a base body (50) of the wiper blade adapter unit (10).

14. A wiper blade system comprising a wiper blade (58) and the wiper blade adapter system according to claim 1 coupled to the wiper blade, wherein the coupling unit of the wiper blade adapter system is directly coupled to the wiper blade, such that the coupling unit is disposed between the wiper blade and each of the connection units in an assembled step.

15. The wiper blade adapter system of claim 1, wherein each of the connection units is a two-piece structure having an intermediate element and a connection element coupled to the intermediate element, wherein at least one of the connection elements is pivotally coupled to the intermediate elements, wherein each of the intermediate elements includes one of the projecting plug elements.

16. A wiper blade adapter system comprising a wiper blade adapter unit (10) having a coupling unit (18) and at least two separate connection units (12, 14, 16) that have different overall forms and are each configured to couple to a different type of wiper arm adapter and to the coupling unit (18), wherein the at least two connection units each include a projecting plug element (24), wherein the coupling unit (18) includes a lateral plug-in unit (20) configured for coupling to the at least two connection units (12, 14, 16) in an assembly step, wherein the lateral plug-in unit (20) includes a receiving element (22) configured for receiving the plug element (24) of each one of the at least two connection units (12, 14, 16), wherein the receiving element (22) includes a mounting channel (26) defined by a closed cross-sectional circumference, wherein the receiving channel extends at least substantially parallel to a wiping direction (54) and is open at one end along the wiping direction such that during the assembly step the projecting plug element (24) of one of the connection units (12, 14, 16) is pushed along the wiping direction (54) and into the mounting channel (26), wherein at least one connection unit (12, 14, 16) of the at least two connection units (12, 14, 16) includes an intermediate element (30, 32, 34), a connection element (64, 66, 68) and a covering part (36) which are formed separately from one another and are coupled to one another in an assembled state.

17. A wiper blade adapter system comprising a wiper blade adapter unit (10) having a coupling unit (18) and at least two separate connection units (12, 14, 16) that have different overall forms and are each configured to couple to a different type of wiper arm adapter and to the coupling unit (18), wherein the at least two connection units each include a projecting plug element (24), wherein the coupling unit (18) includes a lateral plug-in unit (20) configured for coupling to the at least two connection units (12, 14, 16) in an assembly step, wherein the lateral plug-in unit (20) includes a receiving element (22) configured for receiving the plug element (24) of each one of the at least two connection units (12, 14, 16), wherein the receiving element (22) includes a mounting channel (26) defined by a closed cross-sectional circumference, wherein the receiving channel extends at least substantially parallel to a wiping direction (54) and is open at one end along the wiping direction such that during the assembly step the projecting plug element (24) of one of the connection units (12, 14, 16) is pushed along the wiping direction (54) and into the mounting channel (26), wherein each of the connection units is a two-piece structure having an intermediate element and a connection element coupled to the intermediate element, wherein at least one of the connection elements is pivotally coupled to the intermediate elements, and wherein each of the intermediate elements includes one of the projecting plug elements.

* * * * *